United States Patent
Tsai et al.

(10) Patent No.: US 8,581,534 B2
(45) Date of Patent: Nov. 12, 2013

(54) METHOD AND MOTOR DRIVING CIRCUIT FOR ADJUSTING ROTATIONAL SPEED OF MOTOR

(75) Inventors: Ming-Jung Tsai, Hsinchu (TW); Jyun-Ping Jiang, Taoyuan County (TW); Ching-Sheng Li, Hsinchu County (TW); Kun-Min Chen, Changhua County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 10 days.

(21) Appl. No.: 13/397,683

(22) Filed: Feb. 16, 2012

(65) Prior Publication Data

US 2013/0162187 A1    Jun. 27, 2013

(30) Foreign Application Priority Data

Dec. 26, 2011  (TW) .............................. 100148562 A

(51) Int. Cl.
*H02P 6/14*    (2006.01)

(52) U.S. Cl.
USPC .................. 318/400.26; 318/400.06; 318/812

(58) Field of Classification Search
USPC ................................ 318/400.26, 400.06, 812
See application file for complete search history.

(56) References Cited

U.S. PATENT DOCUMENTS

| | | | | |
|---|---|---|---|---|
| 7,759,889 B2 * | 7/2010 | Hirata | ...................... | 318/400.29 |
| 7,826,722 B2 * | 11/2010 | Lin et al. | ...................... | 388/811 |
| 7,961,022 B2 * | 6/2011 | Zhang et al. | ................... | 327/175 |
| 2011/0062910 A1 * | 3/2011 | Tsai et al. | ................. | 318/400.35 |
| 2011/0234140 A1 * | 9/2011 | Kuroda | .......................... | 318/503 |
| 2011/0260669 A1 * | 10/2011 | Nakahata et al. | ............. | 318/503 |
| 2012/0056574 A1 * | 3/2012 | Arisawa | ......................... | 318/696 |
| 2013/0069564 A1 * | 3/2013 | Kaidu et al. | ................... | 318/139 |
| 2013/0127530 A1 * | 5/2013 | Ni et al. | ......................... | 330/251 |

* cited by examiner

*Primary Examiner* — Erick Glass
(74) *Attorney, Agent, or Firm* — Winston Hsu; Scott Margo

(57) ABSTRACT

A method for adjusting rotational speed of a motor is also disclosed. The method includes determining whether an input voltage of the motor enters into a predetermined voltage range; generating a pulse width modulation signal when the input voltage of the motor enters into the predetermined voltage range; and driving the motor to rotate according to the pulse width modulation signal.

7 Claims, 4 Drawing Sheets

US 8,581,534 B2

METHOD AND MOTOR DRIVING CIRCUIT FOR ADJUSTING ROTATIONAL SPEED OF MOTOR

BACKGROUND OF THE INVENTION

1. Field of the Invention

The present invention relates to a method and a motor driving circuit for adjusting a rotational speed of a motor, and more particularly, to a method and a motor driving circuit for adjusting a rotational speed of a motor when an input voltage of the motor enters into a predetermined voltage range.

2. Description of the Prior Art

A motor is an electronic device for transferring electrical energy into dynamic energy, such as a DC motor, an AC motor or a stepper motor, etc. The DC motor is frequently utilized in non-sophisticated control devices, such as a fan. Generally, the DC motor rotates based on a current passing through coils of a stator of the DC motor to generate different amounts or polarized directions of magnetic force to attract or repel a permanent magnet on a rotor of the DC motor to make the motor rotate.

For noise problems in a dissipating heat fan, U.S. Pat. No. 8,063,601, owned by the applicant, discloses a motor driving circuit designed to alter an output voltage for adjusting a rotational speed of the motor, as shown in FIG. 1. The motor 18 can be applied to a dissipating heat fan or other devices, which have one end coupled to a variable voltage source VIN and another end controlled via a motor driving circuit 1. The motor driving circuit 1 includes a motor-driving unit 10, a circuit control unit 12 and a determining unit 14. The circuit control unit 12 further includes a voltage-dropping device 120, a first switching device 122 and a second switching device 124.

The motor driving circuit 1 switches between the first switching device 122 and the second switching device 124 via the circuit control unit 12 to comply with unit-voltage differences provided by the motor-driving unit 10 and the voltage-dropping device 120, which forms different conduction paths to adaptively lower or elevate a terminal voltage of the motor 18 and correspondingly slow down or speed up the rotational speed of the motor 18. Under such circumstances, large amounts of elements/units are used to adjust the terminal voltage and results in a longer responsive period. Besides, the motor 18 must be switched between these two conduction paths. The circuit control unit 12 is utilized to accurately control the switching process or other error-proof circuits must be installed to avoid unnecessary errors during the switching process. Therefore, it has become an important issue to provide another motor driving circuit to adjust the driving voltage source directly passing through the motor to adaptively adjust the rotational speed on the motor.

SUMMARY OF THE INVENTION

It is therefore an objective of the invention to provide a method and a motor driving circuit for adjusting a rotational speed of a motor.

A method of adjusting rotational speed of a motor is disclosed. The method comprises determining whether an input voltage of the motor enters into a predetermined voltage range; generating a pulse width modulation signal when the input voltage of the motor enters into the predetermined voltage range; and driving the motor to rotate according to the pulse width modulation signal.

A motor driving circuit for adjusting rotational speed of a motor is also disclosed. The driving circuit comprises a voltage comparator for determining whether an input voltage of the motor enters into a predetermined voltage range; a pulse width modulation source for generating a pulse width modulation signal when the input voltage of the motor enters into the predetermined voltage range; and a controller for driving the motor to rotate according to the pulse width modulation signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
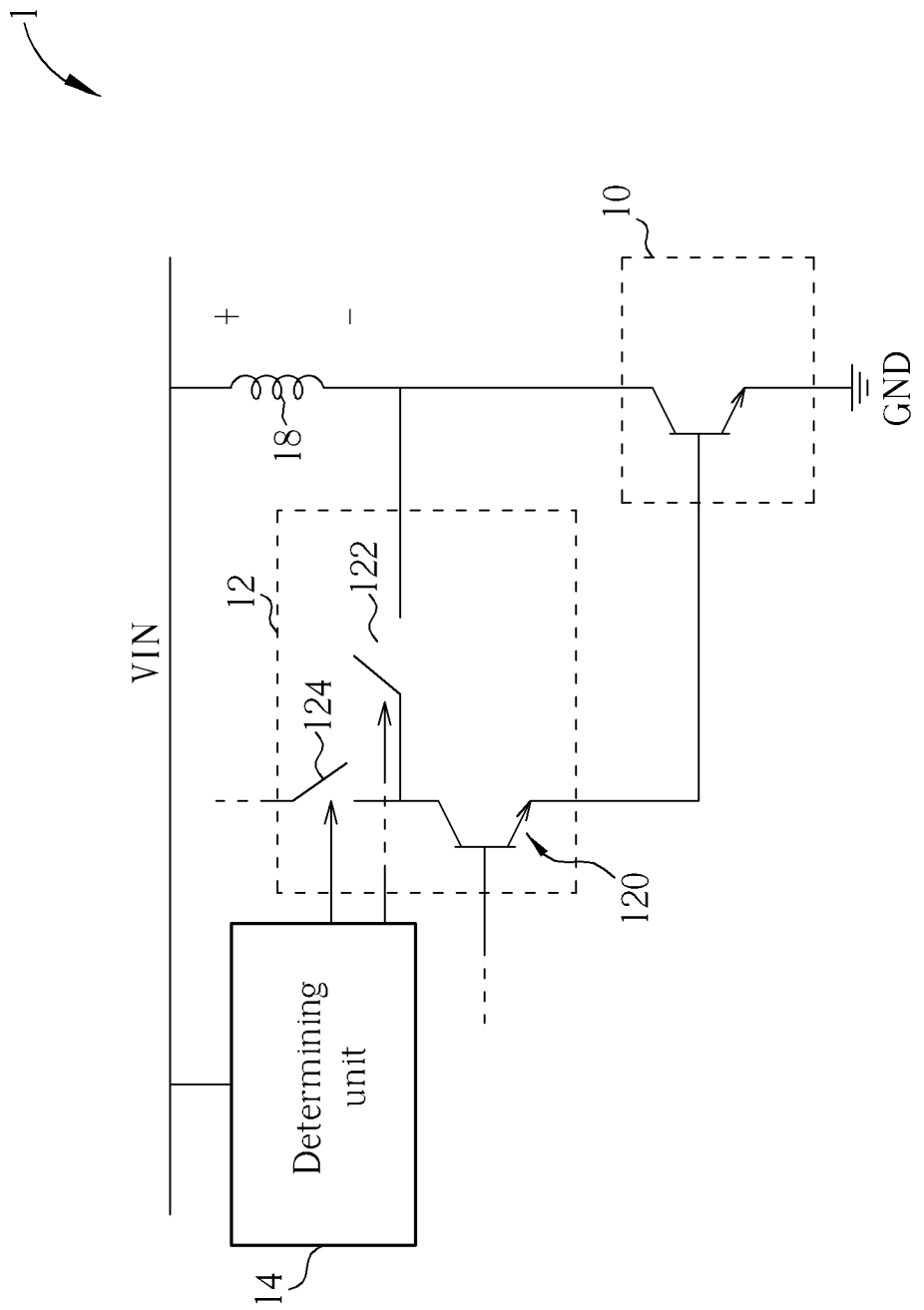
FIG. 1 illustrates a schematic diagram of a conventional motor driving circuit.
Figure 2:
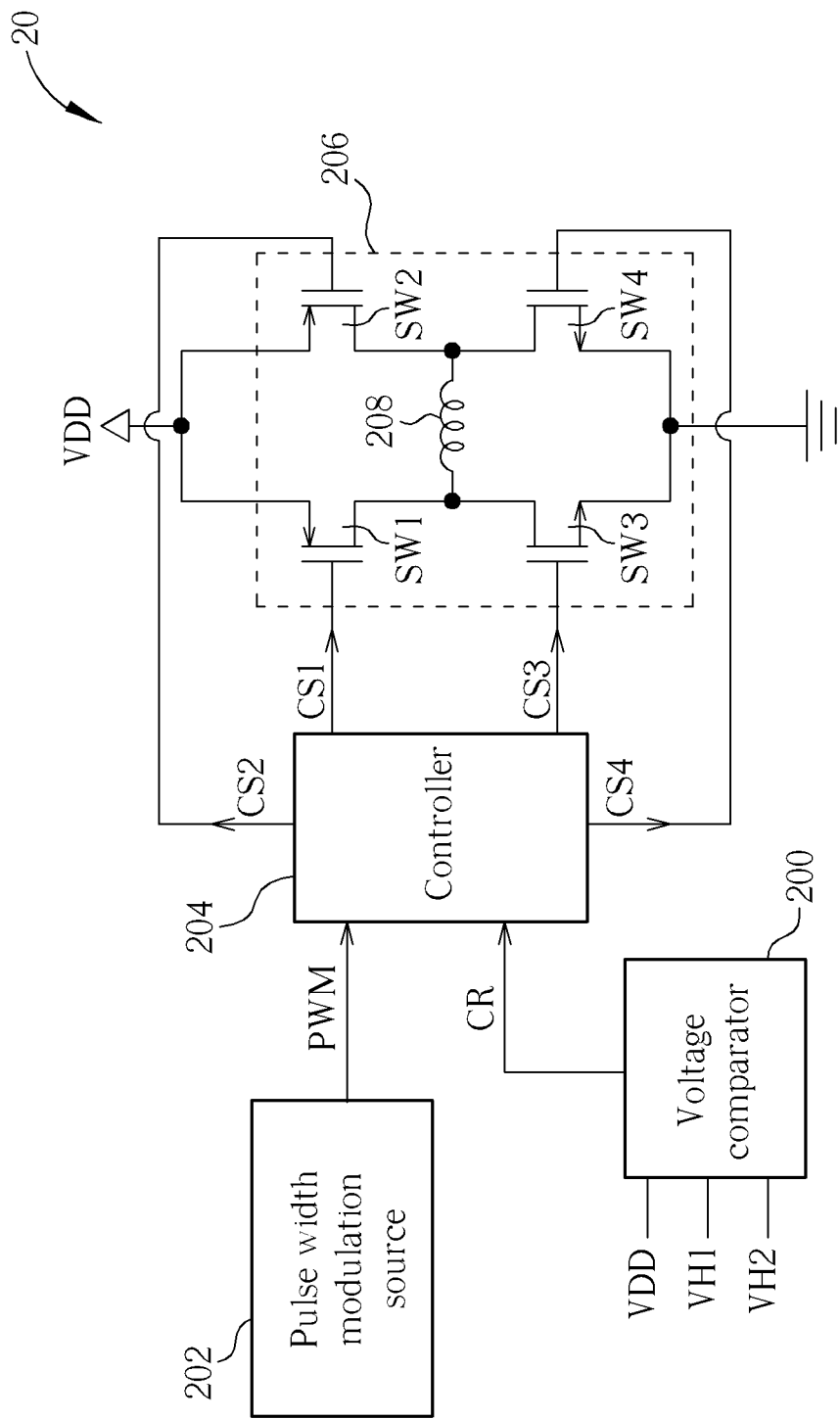
FIG. 2 illustrates a schematic diagram of a motor driving circuit according to an embodiment of the invention.

Please refer to FIG. 2, which illustrates a schematic diagram of a motor driving circuit 20 according to an embodiment of the invention. As shown in FIG. 2, the motor driving circuit 20 for driving a motor 208 includes a voltage comparator 200, a pulse width modulation source 202, a controller 204 and a bridge circuit 206. The bridge circuit 206 includes switches SW1, SW2 forming an up-bridge circuit and switches SW3, SW4 forming a down-bridge circuit, wherein the switches SW1, SW2 are realized by the P-type MOS transistors and the switches SW3, SW4 are realized by the N-type MOS transistors. Certainly, the up-bridge circuit and down-bridge circuit can also be realized via other electronic elements/devices, which is not limited hereinafter.

In this embodiment, the voltage comparator 200 presets a predetermined voltage range from voltage VH1 to VH2, such as 1 volt to 4 volts, so as to compare an input voltage source VDD with the predetermined voltage range and then output a comparison result CR to the controller 204. During increasing of the input voltage source VDD, the pulse width modulation source 202 constantly outputs a pulse width modulation signal PWM to the controller 204, wherein the duty cycle of pulse width modulation signal PWM is adjusted to control how much energy is inputted into the motor 208. The controller 204 receives the comparison result CR from the voltage comparator 200 and the pulse width modulation signal PWM from the pulse width modulation source 202, to control conducting conditions of the bridge circuit 206. In detail, the controller 204 outputs controlling signals CS1, CS2, CS3 and CS4 corresponding to gates of the switches SW1, SW2, SW3 and SW4 to determine the conducting conditions of the up-bridge circuit SW1, SW2 and the down-bridge circuit SW3, SW4 respectively. Due to the switches SW1, SW4 forming a conduction path and the switches SW2, SW3 forming another conduction path, the motor 208 is driven to rotate via switching between these two conduction paths.

Figure 3:
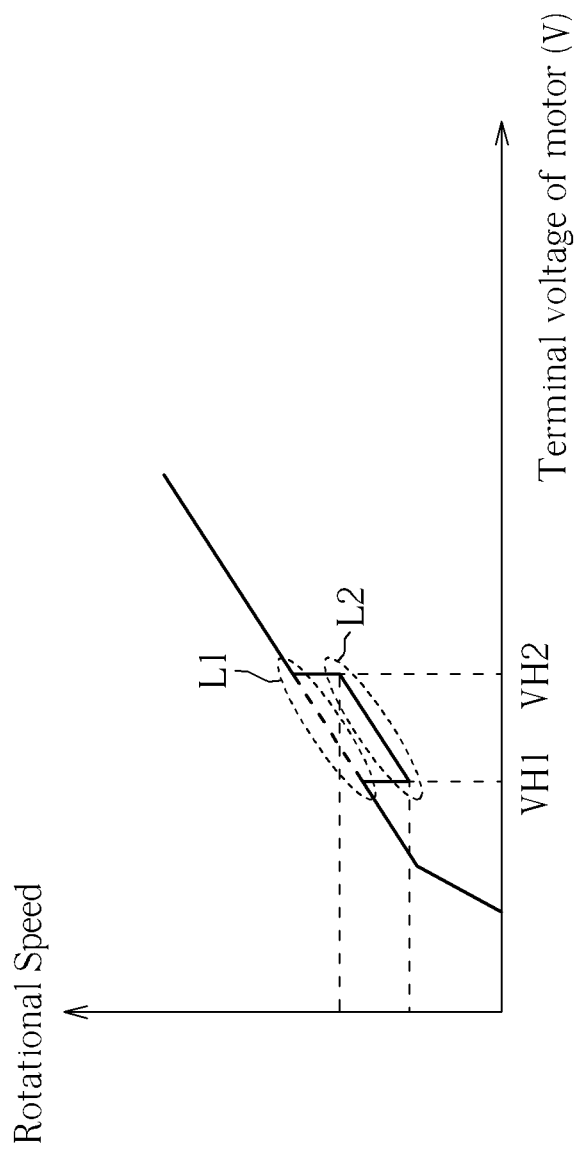
FIG. 3 illustrates a schematic diagram of different terminal voltages of the motor corresponding to different rotational speeds according to an embodiment of the invention.

Please refer to FIG. 3, which illustrates a schematic diagram of different terminal voltages of the motor 208 corresponding to different rotational speeds according to an embodiment of the invention. As shown in FIG. 2 and FIG. 3, during the input voltage source VDD increasing from 0, when the input voltage source VDD is determined to enter into the predetermined voltage range from voltage VH1 to VH2, the voltage comparator 200 adjusts the duty cycle of the pulse width modulation signal PWM to adaptively adjust the rotational speed of the motor 208 according to the comparison result CR. In other words, the motor 208 initially rotates according to the input voltage source VDD and the 100% pulse width modulation signal PWM. When the input voltage source VDD increases to 1 volt, i.e. the input voltage source VDD is determined to enter into the predetermined voltage range, the pulse width modulation signal PWM adjusts its duty cycle according to the comparison result CR. For example, the pulse width modulation signal PWM adjusts its duty cycle from 100% to 50%, which means the motor 208 receives the energy transmitted from the input voltage source VDD (1 volt via conduction of the up-bridge circuit) within 50% of a periodical cycle, and receives no energy within a rest 50% of the periodical cycle. At this moment, it can be regarded as half equivalent energy of the input voltage source VDD (i.e. 0.5 volt) is transmitted to the motor 208, and a terminal voltage of the motor 208 is effectively reduced, which lowers a driving ability of the motor 208. Therefore, the motor 208 changes its rotational speed from a higher rotational speed to a lower rotational speed, such as from 600 revolutions per second corresponding to 1 volt to 300 revolutions per second corresponding to the effective 0.5 volt, so as to control the noises generated by the motor 208.

When the input voltage source VDD increases from 1 volt to 4 volts, the motor 208 will operate with 50% duty cycle, which leads to having the effective terminal voltage vary from 0.5 volt to 2 volts. Once the input voltage source VDD is out of the predetermined voltage range, i.e. exceeding 4 volts, the voltage comparator 200 determines the input voltage source VDD exceeds the predetermined voltage range, so as to lower the duty cycle to restore back to 100% duty cycle. Thus, the terminal voltage of the motor 208 restores the original higher input voltage source VDD without the 50% duty cycle to enhance the driving ability of the motor 208 to operate the motor 208 with the higher rotational speed to effectively cool down a heater. In other words, when the terminal voltage of the motor 208 enters into the predetermined voltage range from VH1 to VH2, as shown in FIG. 3, it switches from a line L1 to a line L2 to slow down the rotational speed of the motor 208. Certainly, it switches from the line L2 to the line L1 again when the input voltage source VDD exceeds the predetermined voltage range.

The motor driving circuit 20 adjusts the effective terminal voltage of the motor 208 according to the comparison result CR and the pulse width modulation signal PWM to switch between different the rotational speeds of the motor 208. From a different perspective, when the motor 208 initiates with the lower input voltage source VDD, such as the mentioned predetermined voltage range from VH1 to VH2, the motor driving circuit 20 adaptively lowers the rotational speed of the motor 208 to avoid the noises generated by the motor 208. Besides, if the input voltage source VDD increases to exceed the predetermined voltage range, it can be anticipated that the user tries to enhance a dissipating heat ability via increasing the input voltage source VDD supplied to the motor driving circuit 20, so as to adaptively provide the user to switch between different operating modes.

Figure 4:
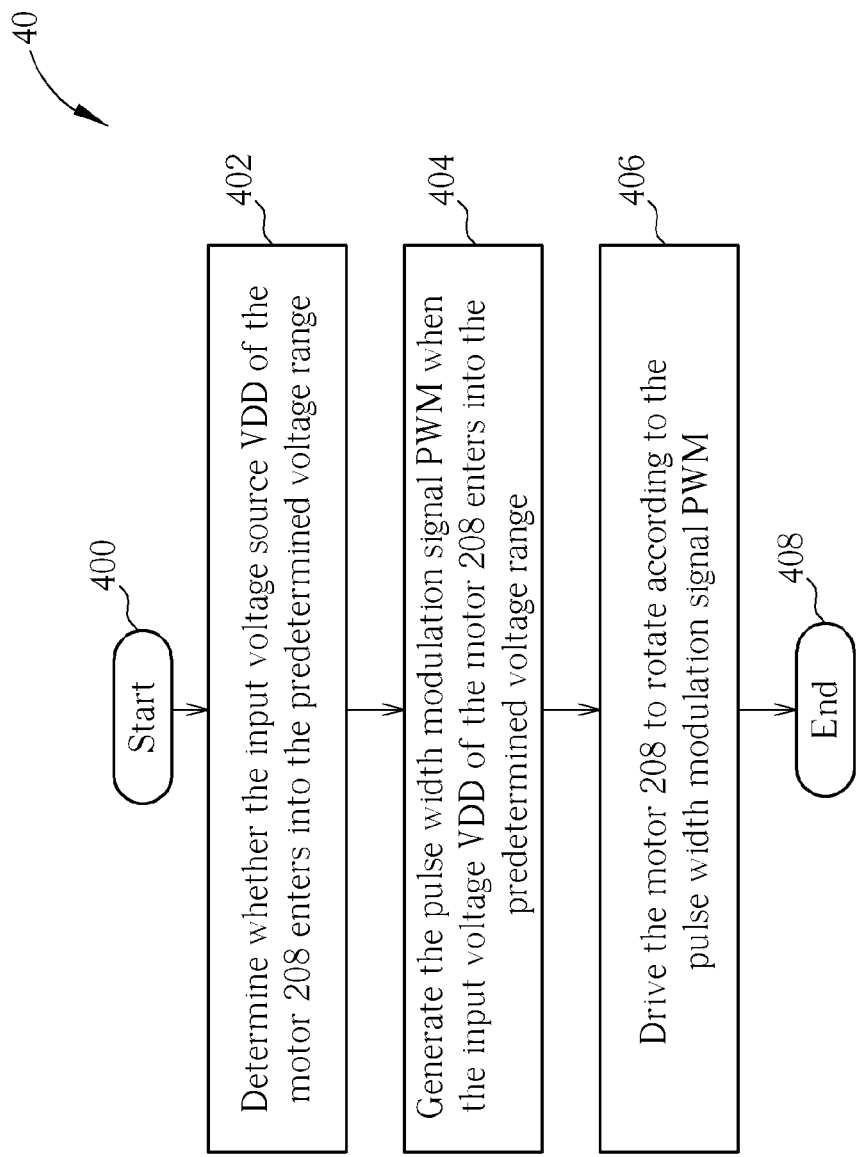
FIG. 4 illustrates a flow chart of an adjusting motor rotational speed process according to an embodiment of the invention.

Further, the method of adjusting rotational speed of the motor 208 in the embodiment of the invention can be summarized as an adjusting motor rotational speed process 40, as shown in FIG. 4. The adjusting motor rotational speed process 40 includes the following steps:

Step 400: Start.
Step 402: Determine whether the input voltage source VDD of the motor 208 enters into the predetermined voltage range.
Step 404: Generate the pulse width modulation signal PWM when the input voltage VDD of the motor 208 enters into the predetermined voltage range.
Step 406: Drive the motor 208 to rotate according to the pulse width modulation signal PWM.
Step 408: End.

Details of the adjusting motor rotational speed process 40 can be explained via the motor driving circuit 20 in FIG. 2 and the different input voltage source VDD of the motor 208 corresponding to different rotational speeds in FIG. 3, which is not described hereinafter.

In comparison with the motor driving circuit 10 of the prior art, the motor driving circuit 20 in the embodiment of the invention uses no circuit control unit 12, the first switching device 122 and/or the second switching device 124 to correspondingly adjust the terminal voltage of the motor 18. Instead, the motor driving circuit 20 directly utilizes the voltage comparator 200 to adjust the duty cycle of the pulse width modulation source 202 to correspondingly adjust the rotational speed of the motor 208, which prevents use of redundant electronic elements/devices to form conduction paths and adaptively provides the user with plenty of operational modes, such as a low noise mode (corresponding to the low rotational speed) or an easy heat-dissipating mode(corresponding to the high rotational speed). Therefore, those skilled in the art can additionally combine/install other logical circuits or software/firmware designs according to practical requirements, so as to dynamically detect/compare the differences between the predetermined voltage range and the input voltage source. As long as modifications achieve the same purpose as the invention, they are all the scope of the invention.

In summary, a motor driving circuit and an adjusting motor rotational speed process are disclosed to utilize a voltage comparator to compare differences between a predetermined voltage range and an input voltage source, to output a comparison result to a controller for adjusting a duty cycle of a pulse width modulation source to correspondingly lower the rotational speed of the motor when the motor operates within the predetermined voltage range, which can avoid unnecessary noises. Simultaneously, when the input voltage source is larger than the predetermined voltage range, the motor restores back to a faster rotational speed to enhance the dissipating heat ability. Further, it adaptively provides the user with different operational modes while operating the motor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method of adjusting rotational speed of a motor, the method comprising:
determining whether an input voltage source of the motor enters into a predetermined voltage range;
generating a pulse width modulation signal when the input voltage source of the motor enters into the predetermined voltage range; and
driving a bridge circuit comprising an up-bridge switch and a down-bridge switch, so as to drive the motor to rotate according to the pulse width modulation signal;
wherein the up-bridge switch comprises a first switch and a second switch coupled between the input voltage source and the motor, the down-bridge switch comprises a third switch and a fourth switch coupled between the motor and a ground, and the first switch and the fourth switch form a first conduction path and the second switch and the third switch form a second conduction path, such that the first conduction path and the second conduction path are sequentially conducted to drive the motor for rotation.

2. The method of claim 1, wherein the pulse width modulation signal maintains a terminal voltage of the motor at a lower voltage value than the input voltage source.

3. The method of claim 2, wherein the lower voltage value corresponds to a slower rotation speed of the motor.

4. A motor driving circuit for adjusting rotational speed of a motor, the driving circuit comprising:
  a voltage comparator for determining whether an input voltage source of the motor enters into a predetermined voltage range;
  a pulse width modulation source for generating a pulse width modulation signal when the input voltage source of the motor enters into the predetermined voltage range; and
  a controller for driving a bridge circuit comprising an up-bridge switch and a down-bridge switch, so as to drive the motor to rotate according to the pulse width modulation signal;
  wherein the up-bridge switch comprises a first switch and a second switch coupled between the input voltage source and the motor, the down-bridge switch comprises a third switch and a fourth switch coupled between the motor and a ground, and the first switch and the fourth switch form a first conduction path and the second switch and the third switch form a second conduction path, such that the first conduction path and the second conduction path are sequentially conducted to drive the motor for rotation.

5. The motor driving circuit of claim 4, wherein the pulse width modulation signal maintains a terminal voltage of the motor at a lower voltage value than the input voltage source.

6. The motor driving circuit of claim 5, wherein the lower voltage value corresponds to a slower rotational speed of the motor.

7. The motor driving circuit of claim 6, wherein the up-bridge switch and the down-bridge switch are utilized for driving the motor to rotate according to a plurality of controlling signals of the controller complying with the pulse width modulation signal.

* * * * *